US012571713B2

(12) United States Patent
Collins et al.

(10) Patent No.: US 12,571,713 B2
(45) Date of Patent: Mar. 10, 2026

(54) CONDENSATION PARTICLE COUNTERS

(71) Applicant: OpenAeros LLC, St. Paul, MN (US)

(72) Inventors: Aaron Michael Collins, Minneapolis, MN (US); Chia Hua M. Pang, St. Paul, MN (US); Rachel Andreasen, St. Paul, MN (US); Christopher Richard Saline Libby, St. Louis Park, MN (US); Louis Avery Goessling, Minneapolis, MN (US)

(73) Assignee: OPENAEROS LLC, Saint Paul, MN (US)

( * ) Notice: Subject to any disclaimer, the term of this patent is extended or adjusted under 35 U.S.C. 154(b) by 150 days.

(21) Appl. No.: 18/428,986

(22) Filed: Jan. 31, 2024

(65) Prior Publication Data

US 2024/0264063 A1 Aug. 8, 2024

Related U.S. Application Data

(60) Provisional application No. 63/443,834, filed on Feb. 7, 2023.

(51) Int. Cl.
*G01N 15/06* (2006.01)
*G01N 15/00* (2006.01)

(52) U.S. Cl.
CPC ... *G01N 15/065* (2013.01); *G01N 2015/0046* (2013.01); *G01N 2015/03* (2013.01)

(58) Field of Classification Search
CPC ......... G01N 15/065; G01N 2015/0046; G01N 2015/03; G01N 2015/0038
USPC ........................................................ 356/37
See application file for complete search history.

(56) References Cited

U.S. PATENT DOCUMENTS

| | | | | |
|---|---|---|---|---|
| 4,790,650 A | * | 12/1988 | Keady | G01N 15/065 |
| | | | | 356/37 |
| 5,609,798 A | | 3/1997 | Liu et al. | |
| 5,983,732 A | | 11/1999 | Hering et al. | |
| 6,284,025 B1 | | 9/2001 | Kreisberg et al. | |
| 6,431,014 B1 | | 8/2002 | Liu et al. | |
| 6,639,671 B1 | | 10/2003 | Liu | |

(Continued)

FOREIGN PATENT DOCUMENTS

| | | | | |
|---|---|---|---|---|
| EP | 3637087 A1 | * | 4/2020 | G01N 15/065 |
| JP | 4180952 B2 | | 11/2008 | |

OTHER PUBLICATIONS

Patricia B. Keady, Getting Data You Need With Particle Measurements, reprinted from Indoor Environment Connections Nov. 2000, vol. 2, Issue 1; https://tsi.com/getmedia/7aa212a7-1d55-45a9-8083-6d936628afbe/ITI-075-US-Getting_Data_You_Need_With_Particle_Measurement?ext=.pdf.

*Primary Examiner* — Tri T Ton
(74) *Attorney, Agent, or Firm* — Edlavitch Law PLLC

(57) ABSTRACT

With respect to some embodiments, described herein is an apparatus for the growth and detection of particles suspended in a gas stream, using a working condensation fluid that has a Lewis number greater or less than unity. The apparatus can include a saturation chamber and a condensation chamber and can produce particle growth by way of a system which offers bidirectional temperature control of both chambers. The apparatus can include a detection system of particles in a detection chamber. A test fluid carrying the particles can pass through the detection chamber and be separated from the detection system with a barrier fluid that is also passing through the detection chamber.

20 Claims, 5 Drawing Sheets

(56) References Cited

U.S. PATENT DOCUMENTS

|  |  |  |  |  |
|---|---|---|---|---|
| 6,829,044 | B2 | 12/2004 | Liu | |
| 7,245,379 | B2 | 7/2007 | Schwabe | |
| 7,363,828 | B2 | 4/2008 | Liu | |
| 7,830,510 | B2 | 11/2010 | Liu | |
| 7,882,799 | B2 | 2/2011 | Dick et al. | |
| 8,088,627 | B2 | 1/2012 | Hering et al. | |
| 8,351,034 | B2 | 1/2013 | Shinoda | |
| 8,459,572 | B2 | 6/2013 | Hering et al. | |
| 8,603,247 | B2 | 12/2013 | Liu et al. | |
| 8,711,338 | B2 | 4/2014 | Liu et al. | |
| 9,658,139 | B2 | 5/2017 | Hering et al. | |
| 9,821,263 | B2 | 11/2017 | Hering et al. | |
| 10,502,665 | B2 | 12/2019 | Milton et al. | |
| 10,914,667 | B2 | 2/2021 | Avula et al. | |
| 11,604,122 | B2 | 3/2023 | Han et al. | |
| 2008/0083274 | A1 | 4/2008 | Hering et al. | |
| 2015/0075372 | A1 | 3/2015 | Hering et al. | |
| 2020/0240894 | A1 | 7/2020 | Isaacman-VanWertz et al. | |
| 2021/0106994 | A1* | 4/2021 | Perkins | G01N 21/645 |
| 2022/0307688 | A1* | 9/2022 | Evans | F23N 5/102 |

* cited by examiner

CONDENSATION PARTICLE COUNTERS

CROSS-REFERENCE TO RELATED APPLICATIONS

The present application claims priority to Prov. U.S. patent application Ser. No. 63/443,834, filed Feb. 7, 2023 and entitled "Condensation Nucleation Particle Counter", the entire disclosure of which application is hereby incorporated herein by reference.

FIELD

Generally, the present disclosure relates to techniques for detecting particles. Specifically, the present disclosure relates to techniques for detecting particles using condensation and nucleation.

BACKGROUND

Laser particle counters can only count particles in an airstream as small as 300 to 500 nanometers (nm) due to the limited light scattering signal available for these particle sizes. The ability to measure particles smaller than 300 nm, which are often called ultrafine particles (UFP), is needed as there is mounting evidence that exposure to UFP's can result in endothelial dysfunction, vascular inflammation, and atherosclerosis. Thus, given these example issues, it would be beneficial to characterize airstreams with respect to concentration of UFPs. This is just one example of the many technical problems solved by the technical solutions described herein.

SUMMARY

Some embodiments described herein include an apparatus that can detect particles using condensation and nucleation.

In some examples, an apparatus includes a detection chamber including a test axis. The apparatus also includes a first fluid conduit in fluid communication with the detection chamber and having a test fluid. In some examples, the test fluid passes through the detection chamber along the test axis in a first direction. The apparatus also includes a second fluid conduit in fluid communication with the detection chamber separate from the first fluid conduit and having a barrier fluid. In some examples, the barrier fluid passes through the detection chamber in a second direction. In some examples, the first direction is parallel to the second direction. The apparatus also includes a detection system configured to monitor at least one characteristic of the test fluid (such as within the detection chamber) to determine a number of particles in the test fluid. In some examples, the barrier fluid separates the test fluid from the detection system (such as within the detection chamber). In some examples, the apparatus also includes at least one outlet fluid conduit configured to carry each of the test fluid and the barrier fluid away from the detection chamber.

In some examples, the barrier fluid surrounds the test fluid. In some examples, the second fluid conduit has a dryer inner surface than the inner surface of the first fluid conduit. In some examples, the first fluid conduit and the second fluid conduit are located in a housing. In some examples, the second fluid conduit includes a filter to remove particles in the barrier fluid sized from 2.0 nanometers (nm) to 100,000 nm. In some examples, the test fluid has a temperature similar to the temperature of the barrier fluid within the detection chamber. In some examples, the test fluid has a vapor pressure higher than the vapor pressure of the barrier fluid within the detection chamber. In some examples, a portion of the test fluid contacts a portion of the barrier fluid forming a fluid interface in the detection chamber. In some examples, the fluid interface has an interface vapor pressure less than the saturation vapor pressure of the test fluid.

In some examples, the first fluid conduit includes a saturation chamber and a condensation chamber. In some examples, the saturation chamber and the condensation chamber are situated sequentially along the flow direction of the test fluid. In some examples, the apparatus includes a first temperature control apparatus coupled to a wall of the saturation chamber to control a temperature of the test fluid passing through the saturation chamber to a first temperature and a second temperature control apparatus coupled to a wall of the condensation chamber to control a temperature of the test fluid passing through the condensation chamber to a second temperature. In some cases, the second temperature being different from the first temperature. In some examples, the first temperature is higher than the second temperature when the test fluid has a Lewis Number of larger than 1.0. In some examples, the first temperature is lower than the second temperature when the test fluid has a Lewis Number of less than 1.0.

In some examples, the detection system comprises: a laser configured to produce a laser beam and a photodetector configured to detect light scattered from the laser beam hitting a particle in the test fluid. In some examples, the photodetector is at a 90 degree angle to the laser beam. In some examples, the photodetector is between a 90 degree and 180 degree angle to the laser beam. In some examples, the detection system is configured to adjust the intensity of the laser beam based on detection of scattered light by the photodetector. In some examples, the apparatus is part of a system, and the system can include an air drawer in fluid connection with the detection chamber configured to pull the test fluid through the first fluid conduit. In some examples, the system includes a controller configured to collect data of scattered light from the photodetector. The controller can also measure the pulse width of the collected data and determine the velocity of the particle. The controller can also calculate the flow rate of the fluid stream and adjust the speed of the air drawer based on the calculated flow rate.

These and other important aspects of the invention are described more fully in the detailed description below. The invention is not limited to the particular apparatuses and systems described herein. Other embodiments can be used and changes to the described embodiments can be made without departing from the scope of the claims that follow the detailed description. Within the scope of this application, it should be understood that the various aspects, embodiments, examples, and alternatives set out herein, and individual features thereof can be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

The present disclosure will be understood more fully from the detailed description given below and from the accompanying drawings of various example embodiments of the disclosure.

DETAILED DESCRIPTION OF THE DRAWINGS

Figure 1:
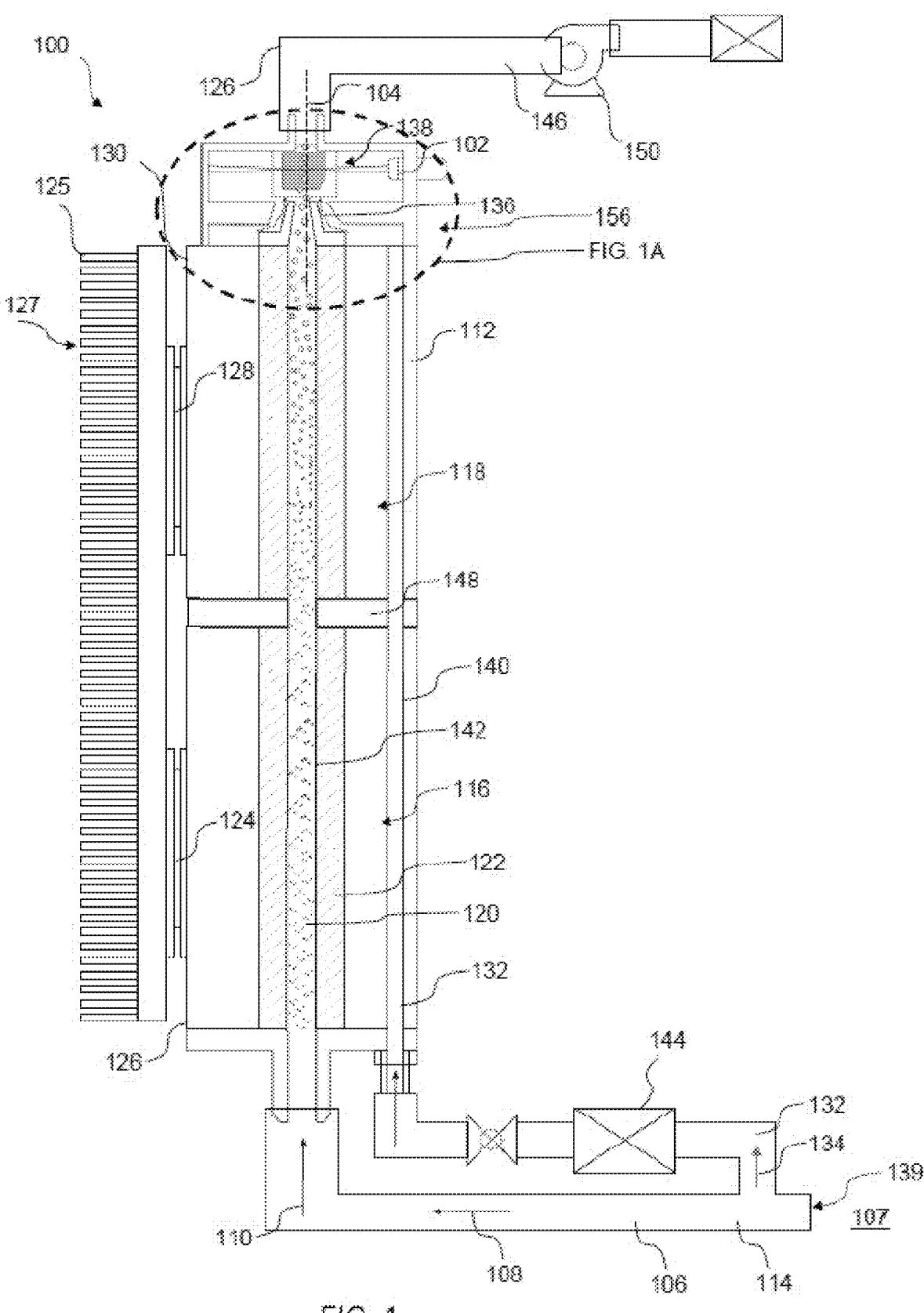
FIG. 1 illustrates a condensation particle counter, in accordance with some embodiments of the present disclosure.

Details of example embodiments of the invention are described in the following detailed description with reference to the drawings. Although the detailed description provides reference to example embodiments, it is to be understood that the invention disclosed herein is not limited to such example embodiments. But to the contrary, the invention disclosed herein includes numerous alternatives, modifications, and equivalents as will become apparent from consideration of the following detailed description and other parts of this disclosure.

The present application discloses apparatuses and systems that include a detection system for particle detection and that can leverage condensation in the detection of particles. In some examples, a condensation-based particle counter is included with a detection system. The condensation-based particle counter and detection system is referred to herein as a condensation particle counter (CPC). The CPC is a device that can measure total particle count present in a sample airstream. The CPC can use condensation vapor growth to enlarge particles, thereby effectively increasing the size particles to a more detectable size (e.g., 10 nm particles can be enlarged to 5000 nm). Growing particles larger provides a system, which can include an optical counter, to detect and count the presence of smaller particles in the size range from 10 to 5000 nm in diameter.

In some embodiments, the CPCs function to grow and detect particles suspended in a gas stream, using a working condensation fluid that has a Lewis number greater or less than unity. As used herein, the term "Lewis number" refers to the ratio of thermal diffusivity to mass diffusivity used to characterize fluid flows where there is simultaneous heat and mass transfer. The Lewis number for example fluid used in some variations of the CPC is listed in Table 1.

TABLE 1

| Lewis number of example fluid used in a CPC | | |
| --- | --- | --- |
| Fluid | Vapor Diffusion (cm²/s) | Lewis number |
| Water | 0.399 | 0.561 |
| 1-Butanol | 0.092 | 2.434 |
| Isopropyl Alcohol | 0.10626 | 2.107 |
| Polyethylene glycol (PEG) | 0.102 | 2.195 |

*Lewis numbers listed in Table 1 are calculated based on an air thermal diffusivity of 0.2239 cm²/s.

As used herein, the term "saturation vapor pressure" refers to the static pressure of a vapor when the vapor phase of some material is in equilibrium with the liquid phase of that same material. The saturation vapor pressure of any material is dependent on the temperature of that material. As temperature rises the saturation vapor pressure rises nonlinearly. The term can also be applied to a mixture of gases.

In some embodiments, an apparatus can include a saturation chamber and a condensation chamber and produce particle growth by way of a system which offers bidirectional temperature control of both chambers. The saturation chamber and the condensation chamber can be part of a test flow system. In some embodiments, the bidirectional temperature control is achieved using a shared thermal bridge system having at least one temperature control apparatus. The at least one temperature control apparatus can be configured to control the temperature of a test fluid passing through the saturation chamber to a first temperature. The at least one temperature control apparatus can also be configured to control the test fluid passing through the condensation chamber to a second temperature. In some cases, the second temperature being different from the first temperature.

In some embodiments, the apparatus can include a bypass flow system. The bypass flow system and the test flow system can be in fluid communication with a detection chamber having a detection system. The arrangement of the introduction of fluid from each of the bypass flow system and the test flow system can reduce the likelihood of condensation on the detection system components, in some embodiments. The bypass flow system and the test flow system can be provided in a housing.

In some embodiments, the apparatus can include a first fluid conduit in fluid communication with the detection chamber and carrying a test fluid. In some examples, the test fluid passes through the detection chamber along a test axis in a first direction. The apparatus can also include a second fluid conduit in fluid communication with the detection chamber separate from of the first fluid conduit and having a barrier fluid. This second fluid conduit can include or be a part of the bypass flow system. The barrier fluid passing through the detection chamber can pass in a second direction parallel or substantially parallel to the first direction. In some examples, the second direction is one of the same as the first direction or opposite the first direction. In some embodiments, the detection chamber can include or otherwise provide access to a detection system monitoring at least one characteristic of the test fluid within the detection chamber to determine a number of particles in the test fluid. In some embodiments, the detection chamber includes at least one outlet fluid conduit to carry each of the test fluid and the barrier fluid away from the detection chamber. In some embodiments, the barrier fluid separates the test fluid from the detection system within the detection chamber. In some embodiments, the barrier fluid surrounds or substantially surrounds the test fluid.

In some embodiments, detection system includes an integrated optical detection unit having a laser and a photodetector configured to detect light scattered from the laser hitting a particle in the test fluid. In some examples, the apparatus or detection systems is configured to measure particles (e.g., detect the presence thereof, or establish a particle count) in the size range from 10-5000 nm or more, for example.

In some embodiments, the CPC or a system including the apparatus includes an air drawer in fluid connection with the detection chamber to pull the test fluid through the first fluid conduit and the detection chamber. In some examples, the air drawer includes a fan and a pump. In some embodiments, the CPC or a system including the apparatus further includes a controller configured to collect data of scattered light from a photodetector, measure the pulse width of the collected data, determine a velocity of the particle, determine a flow rate of the fluid stream, and adjust a speed of the air drawer based on the determined flow rate.

As shown in FIG. 1, an example condensation particle counter 100 is shown. As shown in FIG. 1, condensation particle counter 100 includes a detection chamber 102 including a test axis 104, a first fluid conduit 106 in fluid communication with the detection chamber 102 and carrying a test fluid 108. The test fluid 108 passes through the detection chamber 102 along the test axis 104 in a first direction 110. First fluid conduit 106 is in fluid communication with an environment 107 having a fluid to be tested, illustratively the test fluid 108.

Detection chamber 102 can be made of thermally conductive materials (e.g., copper, aluminum nitride, silicon carbide, aluminum, tungsten, graphite, zinc, etc.). In some embodiments, the detection chamber 102 can be made of thermally non-conductive materials (e.g., plastic, glass, rubber, ceramic, etc.). In some embodiments, detection chamber 102 can be made of material having thermal conductivity of less than 1.0 W/mK or between 0.1 to 0.5 W/mK. In some instances, the detection chamber 102 can be made of plastic such as acrylic, epoxy, nylon, low density polyethylene (PEL), high density polyethylene (PEH), polytetrafluoroethylene (PTFE), polyvinyl chloride (PVC), polycarbonate (PC), polyimide, polyethylene oxide (PPO), polypropylene (PP), or polyurethane (PUR). Although it can be advantageous to form the detection chamber of conductive materials (e.g., to facilitate use of a thermal heater to help protect the detection optics of an example detection system from condensation or particle deposition), non-conductive materials such as polymeric materials can be more cost effective to manufacture sometimes. As subsequently described, in some examples, the detection chamber 102 can be supplied with a sheath flow or bypass flow protecting the optics of the detection system from vapor to facilitate use of non-conductive, or less conductive materials, such as polymerics.

Test axis 104 can be an axis along which test fluid 108 is passing through detection chamber 102. In some embodiments, test axis 104 can be vertical, for example as shown in FIG. 1. In some embodiments, text axis 104 can be angled relative to vertical including horizontal. Although a linear flow along test axis 104 is described, other non-linear flow paths can be used.

First fluid conduit 106 is illustrated as including a first portion in an inlet tube 114 and a second portion in a housing 112. The inlet tube 114 can be glued, friction fit, heat sealed, or otherwise coupled to housing 112. In some embodiments, first fluid conduit 106 can be a single piece conduit. Housing 112 can be coupled to a detection housing 156 including detection chamber 102 via an air tight seal. Example couplings that can be used include a threaded coupling, adhesive coupling, welded coupling, such as spin welding, and other suitable arrangements. In some embodiments, first fluid conduit 106 can facilitate a continuous and laminar flow of the test fluid 108.

First fluid conduit 106 can include a saturation chamber 116 and a condensation chamber 118 within housing 112. As shown in FIG. 1, a thermal insulator 148 separates saturation chamber 116 and condensation chamber 118. Housing 112 can be a multi-piece housing including a first portion for saturation chamber 116 and a second portion for condensation chamber 118 or a single piece housing. In some embodiments, for example as shown in FIG. 1, saturation chamber 116 can be coupled to condensation chamber 118 via an air tight seal. In some embodiments, saturation chamber 116 and the condensation chamber 118 can be integrally formed as one part.

Test fluid 108 can be a fluid stream including particles 120 to be detected. In some instances, the size of the particles 120 can range from 10 to 5000 nm in diameter. In certain instances, the size of the particles can range from 300 nm to 500 nm in diameter. In certain instances, the size of the particles can be up to 500 nm in diameter. In certain instances, the size of the particles can be up to 300 nm in diameter. For the avoidance of doubt, the fluid stream can include particles of lower or high ranges of diameters outside of a range of a predetermined detection range. The particles can have a size corresponding to a predetermined test size, or predetermined detection range. In some instances, the particles to be detected can be ultrafine particles (UFP) having sizes of less than 300 nm in diameter and are hard to detect using a typical laser particle counter. In some examples, test fluid 108 can be carrying from 0 to $5*10^5$ particles/cm$^3$, or from 1.0 to $1.0*10^3$ particles/cm$^3$, or from 10 to 100 particles/cm$^3$. In some instances, test fluid 108 can be air.

As shown in FIG. 1, test fluid 108 can be introduced through the inlet tube 114, then mixed with a condensation fluid in the saturation chamber 116. Although not shown, In some embodiments, inlet tube 114 can include a filter to remove particles above a certain size from the test fluid. As mentioned above, the Lewis number is a dimensionless number that compares the thermal diffusivity of a transport medium to the vapor diffusivity of a condensation fluid. In some embodiments, the transport medium of the particles 120 is air, corresponding to the test fluid 108. In some embodiments, the condensation fluid can have a Lewis number larger than unity. In some embodiments, the condensation fluid can have a Lewis number smaller than unity. In some embodiments, the condensation fluid can have a Lewis number from 0.4 to 0.6. In some embodiments, the condensation fluid can have a Lewis number from 2.0 to 3.0. In some embodiments, the condensation fluid can be water or an alcohol (e.g., 1-Butanol, Isopropyl Alcohol, or Polyethylene glycol (PEG)).

In some embodiments, the condensation fluid can be introduced into saturation chamber 116 through a reservoir (not shown). The reservoir can be formed integrally with condensation particle counter 100 or the reservoir can be an external reservoir that is separately connected to saturation chamber 116 of condensation particle counter 100. In some embodiments, walls 122 of the saturation chamber 116 can be made of a sponge material, porous material, hydrophilic material (e.g., hydrogel) or other suitable material to be wetted with the condensation fluid.

In some embodiments, condensation particle counter 100 can include a first temperature control apparatus 124 coupled to an external wall 126 of housing 112 adjacent to saturation chamber 116 to control a temperature of test fluid 108 passing through saturation chamber 116 to a first temperature (T1). Condensation particle counter 100 can further include a second temperature control apparatus 128 coupled to an external wall 130 of housing 112 adjacent to condensation chamber 118 to control a temperature of test fluid 108 passing through condensation chamber 118 to a second temperature (T2). In some embodiments, condensation particle counter 100 includes thermal insulator 148 between saturation chamber 116 and condensation chamber 118 so as to, for example, reduce heat transfer to or from saturation chamber 116 to condensation chamber 118. Thermal insulator 148 helps insulate saturation chamber 116 and condensation chamber 118 from each other such that the temperature of each chamber can be controlled separately via the first and second temperature control apparatuses 124, 128. In some embodiments, the second temperature T2 of second temperature control apparatus 128 is different from the first temperature T1 of first temperature control apparatus 124.

In some embodiments, first temperature control apparatus 124 and second temperature control apparatus 128 can include one or more electrical heaters or electrical coolers, such as a solid state thermoelectric heat pump to control the temperature of saturation chamber 116 and condensation chamber 118, respectively. A controller 402 (e.g., see FIG. 4) or first temperature control apparatus 124 and second temperature control apparatus 128 themselves can monitor the temperatures T1 and T2 through one or more sensors (not shown). In some instances, when the condensation fluid has a Lewis Number of larger than 1.0, the first temperature T1 is higher than the second temperature T2. In some cases, when the test fluid has a Lewis Number of less than 1.0, the first temperature T1 is lower than the second temperature T2.

In some embodiments, as test fluid 108 passes through saturation chamber 116 and condensation chamber 118, particles 120 in test fluid 108 can act as condensation nuclei for the condensation fluid to condense on particles 120 to achieve particle growth. In such an example, the condensation growth mechanism is achieved by creating a region of super saturation within first fluid conduit 106. To create the region of super saturation, the thermal diffusivity of transport medium (e.g., air) needs to be different from the vapor diffusivity of the condensation fluid. For example, in some cases, the Lewis number of the condensation fluid needs to be greater than 1.0 or less than 1.0 and not equal to 1.0. The further Lewis number is from 1.0, or unity, the more effective condensation growth becomes.

The value of the Lewis number being greater or less than unity can be a factor in determining the relative temperatures (T1 and T2) of saturation chamber 116 and condensation chamber 118. If the Lewis number is greater than unity, for example, when the condensation fluid used is an alcohol having a Lewis number around 2.0, saturation chamber 116 has a higher temperature T1 than the temperature T2 of condensation chamber 118. Test fluid 108 carrying particles 120 is mixed with the condensation fluid at a higher temperature and then moves through the cooler condensation chamber 118 for condensational growth of suspended particles 120. The higher temperature T1 can be 35° C. and the lower temperature T2 can be 10° C.

If the Lewis number is less than unity, for example, when the condensation fluid used is water having a Lewis number around 0.5, saturation chamber 116 has a lower temperature T1 than the temperature T2 of condensation chamber 118. Test fluid 108 carrying particles 120 is mixed with the condensation fluid at a lower temperature and then moves through the warmer condensation chamber 118 for condensational growth of the suspended particles 120. The lower temperature T1 can be 10° C., whereas the higher temperature T2 can be 35° C.

The relative locations of saturation chamber 116 and condensation chamber 118 can be arranged differently from what is shown in FIG. 1. For example, saturation chamber 116 can be above the condensation chamber 118 such that the test fluid 108 passes downward through the chambers in a direction opposite to the first direction 110. In some examples, saturation chamber 116 and condensation chamber 118 can be arranged such that test fluid 108 passes through the chambers in a horizontal direction. In some instances, the direction the test fluid 108 passes through the saturation chamber 116 and the condensation chamber 118 is not horizontal or vertical.

In some examples, a bi-directional thermal control of saturation chamber 116 and condensation chamber 118 allows the condensation particle counter 100 to enlarge particles with working fluids having a Lewis Number of less than unity and greater than unity using the condensation particle counter 100. First temperature control apparatus 124 and second temperature control apparatus 128 can be connected to a shared thermal heatsink 125 or separate thermal heatsinks.

The shared thermal heatsink 125 can include one or more fins 127 to increase a surface area of shared thermal heatsink 125. The shared thermal heatsink 125 can be coupled to the first temperature control apparatus 124 and second temperature control apparatus 128, which are coupled to an external wall 126 of saturation chamber 116 and an external wall 130 of condensation chamber 118 via any of a variety of mechanisms (e.g., thermal adhesive or thermal paste) to improve performance of the heatsink through more efficient heat transfer. In some embodiments, the shared thermal heatsink 125 can be made out of aluminum or copper.

Figure 1A:
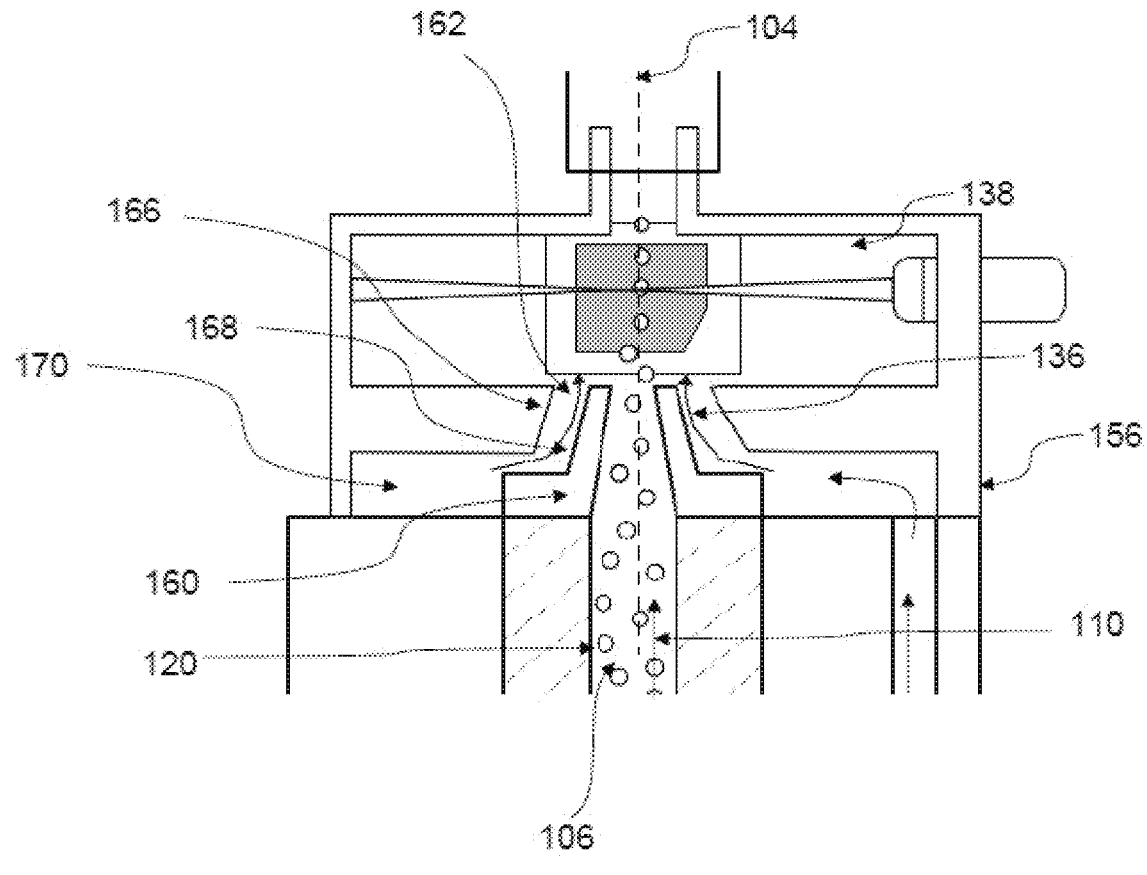
FIG. 1A illustrates a portion of the condensation particle counter of FIG. 1.

In some embodiments, condensation particle counter 100 can include a second fluid conduit 132 in fluid communication with the detection chamber 102 independent of first fluid conduit 106 and carrying a barrier fluid 134. As shown in FIG. 1A, barrier fluid 134 can pass through detection chamber 102 in a second direction 136 parallel or substantially parallel to the first direction 110.

In some instances, for example as shown, barrier fluid 134 passes through detection chamber 102 in direction 136 the same or substantially the same as the first direction 110. In some examples (not shown), the barrier fluid 134 can pass through the detection chamber in a direction opposite or substantially opposite to the first direction 110.

In some embodiments, such as including the illustrated condensation particle counter 100 of FIG. 1, second fluid conduit 132 can be in fluid communication with first fluid conduit 106 and configured to divert part of test fluid 108 to be barrier fluid 134. The first fluid conduit 106 and second fluid conduit 132 receive fluid from the environment 107 through a common input 139. In some embodiments, second fluid conduit 132 can have a separate input from first fluid conduit 106 and be completely fluidly independent of first fluid conduit 106. In some instances, barrier fluid 134 can be the same fluid as the test fluid 108. In some instances, where the second fluid conduit is separate from first fluid conduit 106, barrier fluid 134 can be a different fluid from test fluid 108.

In some embodiments, second fluid conduit 132 has a relatively dry inner surface 140 compared to inner surface 142 of first fluid conduit 106. In some examples, the test fluid 108 is mixed with a condensation fluid in the saturation chamber 116. As such, inner surface 142 of first fluid conduit 106 is wet with condensation fluid introduced into saturation chamber 116 either through a reservoir, or from the walls of saturation chamber 116 being wetted with condensation fluid.

In some embodiments, the first fluid conduit 106 can be cylindrical in shape. Second fluid conduit 132 can be a separate conduit parallel to first fluid conduit 106 and not contacting first fluid conduit 106. As shown, the first fluid conduit 106 and second fluid conduit 132 can be located inside housing 112. In some other embodiments, first fluid conduit 106 can be located inside housing 112 whereas second fluid conduit 132 can be located outside housing 112.

In some embodiments, barrier fluid 134 passes a filter 144 to remove particles above a given size from the air entering from the environment 107. In some embodiments, filter 144 removes particles in the barrier fluid 134 sized from 100 nm and higher.

Figure 1B:
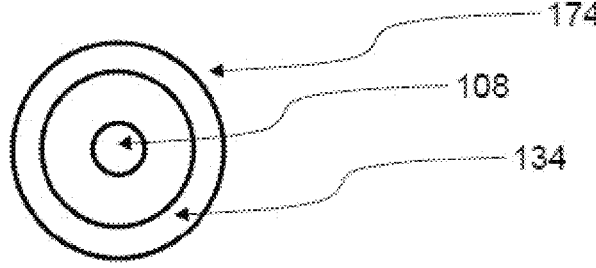
FIG. 1B illustrates a test fluid and a barrier fluid passing through a detection chamber of the condensation particle counter of FIG. 1.

As shown in FIGS. 1A and 1B, in some embodiments, test fluid 108 enters detection chamber 102 through a nozzle 160 in an opening 162 in a lower wall 164 of detection housing 156. Barrier fluid 134 can be guided into detection chamber 102 through a space formed between a wall 166 of opening 162 in lower wall 164 and an outer surface 168 of nozzle 160. Prior to entering the space formed between wall 166 and outer surface 168 of nozzle 160, barrier fluid 134 can spread throughout chamber 170. Each of wall 166, outer surface 168, and chamber 170 are a part of symmetrical test axis 104. The result being shown in FIG. 1B, wherein barrier fluid 134 forms a cylindrical barrier 174 to test fluid 108. This cylindrical barrier 174 reduces the communication of moisture from test fluid 108 to parts of detection chamber 102 outside of cylindrical barrier 174.

In some embodiments, condensation particle counter 100 can further include a detection system 138 monitoring at least one characteristic of test fluid 108 within detection chamber 102 to determine a number of particles 120 in test fluid 108. Barrier fluid 134 separates test fluid 108 from detection system 138 within detection chamber 102. In some embodiments, detection system 138 is an optical system.

Figure 2:
FIGS. 2 and 3 illustrate example optical detection systems, in accordance with some embodiments of the present disclosure.
Figure 2:
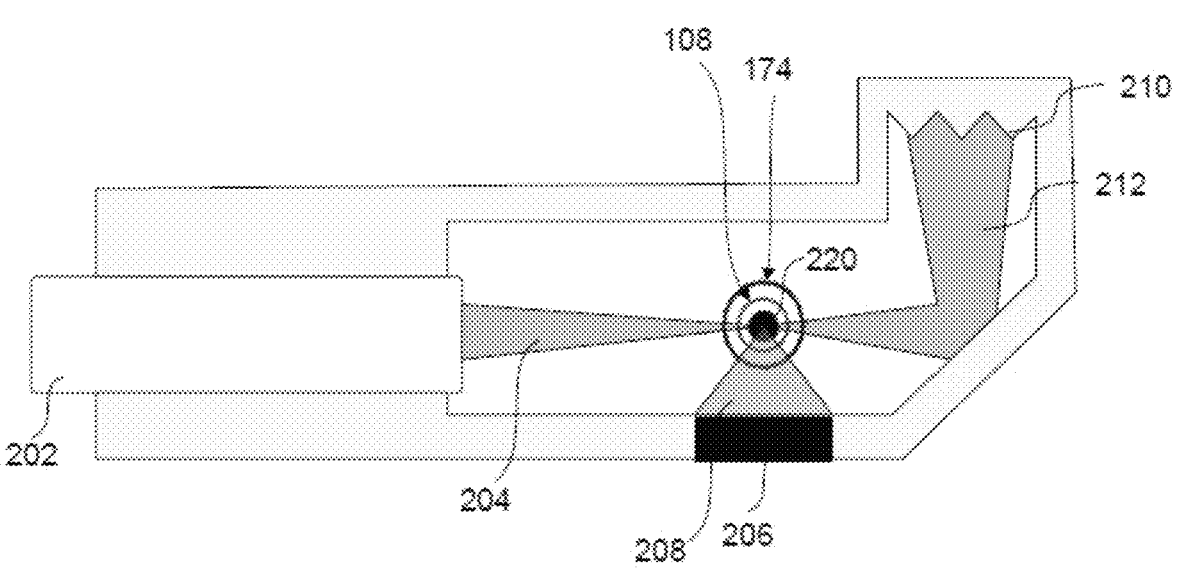

In some embodiments, detection system 138 is an optical system and includes a laser 202 and a photodetector 206 (e.g., see FIG. 2). In some embodiments, a single photodetector 206 is implemented. In some embodiments, a photodetector array is implemented. Barrier fluid 134 can separate or sheath test fluid 108 from detection system 138 in such a way that laser 202 and photodetector 206 are protected from the moisture vapor in test fluid 108 condensing thereon. In addition, the detection system 138 can be protected from the particle 220 in test fluid 108 depositing on laser 202 or photodetector 206. In some embodiments, barrier 174 created by barrier fluid 134 surrounds test fluid 108.

In some embodiments, test fluid 108 has a temperature similar or a temperature substantially similar to a temperature of barrier fluid 134 within detection chamber 102. Test fluid 108 can have a first vapor pressure higher than a second vapor pressure of barrier fluid 134, such that, when a portion of test fluid 108 contacts a portion of barrier fluid 134 forming a fluid interface in detection chamber 102, the fluid interface has an interface vapor pressure less than a saturation vapor pressure of test fluid 108 after passing through the saturation chamber 116 and condensation chamber 118.

In some embodiments, condensation particle counter 100 includes at least one outlet fluid conduit 146 to carry each of test fluid 108 and barrier fluid 134 away from detection chamber 102. In some embodiments, condensation particle counter 100 includes an air drawer 150 in fluid connection with detection chamber 102 configured to pull test fluid 108 through first fluid conduit 106.

FIG. 2 depicts an example optical detection system 200. Optical detection system 200 can be included in housing 156 and be used to detect particles.

Optical detection system 200 includes a laser 202 configured to produce a laser beam 204. In some embodiments, laser 202 includes a lens which produces a focused laser beam. The focused laser beam can have a beam intensity from 0.5 W/cm2 to 1200 W/cm2. A focused laser beam increases the amount of scattered light when hitting a particle.

Optical detection system 200 includes a photodetector 206 (e.g., a photodiode) configured to detect or collect scattered light 208 from laser beam 204 hitting particle 220. Particle 220 can be a particle carried by a fluid stream (e.g., the test fluid 108) flowing through detection chamber 102. The focused laser beam 204 can produce higher intensity scattered light compared to an expanded laser beam such that no lenses are needed to focus scattered light onto photodetector 206. Optical detection system 200 can adjust the intensity of laser beam 204 based on the detection or collection of scattered light 208.

Figure 3:
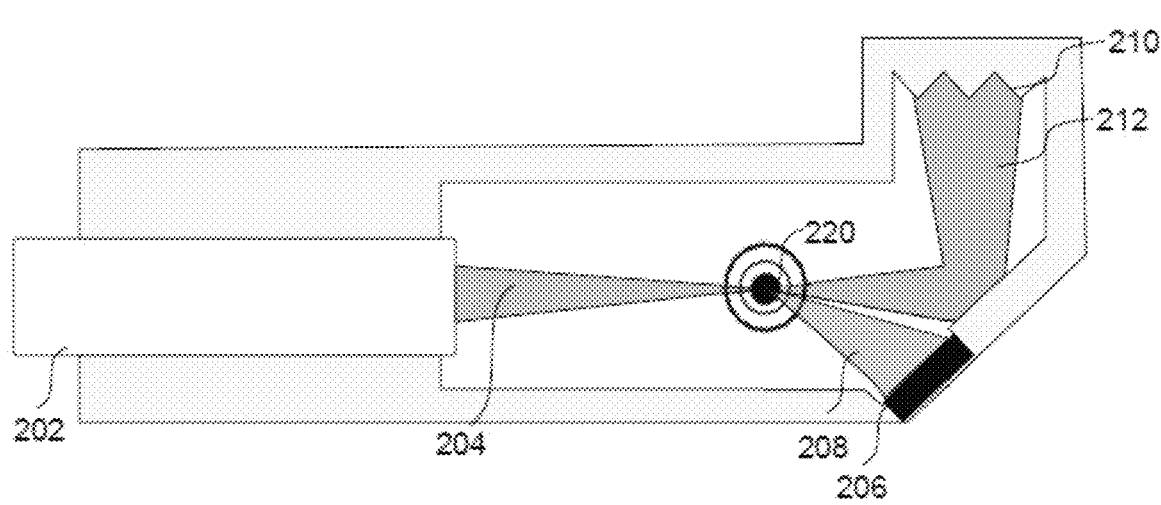

In FIG. 2, photodetector 206 is shown at a 90 degree angle to the direction of laser beam 204 exiting laser 202. The scattered light 208 collected by the photodetector 206 can have a scattering angle of 90 degrees. In some instances, the collected scattered light 208 having a scattering angle of 90 degrees has an irradiance from 0.001 mW/cm2 to 0.1 mW/cm2. In FIG. 3, another arrangement 300 is shown wherein photodetector 206 is positioned to form an obtuse angle with respect to the direction of laser beam 204 exiting laser 202. In some embodiments, the obtuse angle is between 100 degrees and 170 degrees. In some embodiments, the obtuse angle is 135 degrees.

In some embodiments, the distance between photodetector 206 and particle 220 is smaller than the distance between laser 202 and particle 220. In some embodiments, the optical detection system 200 can further include a light trap 210 which absorbs uncollected or forward scattered laser beam 212.

Figure 4:
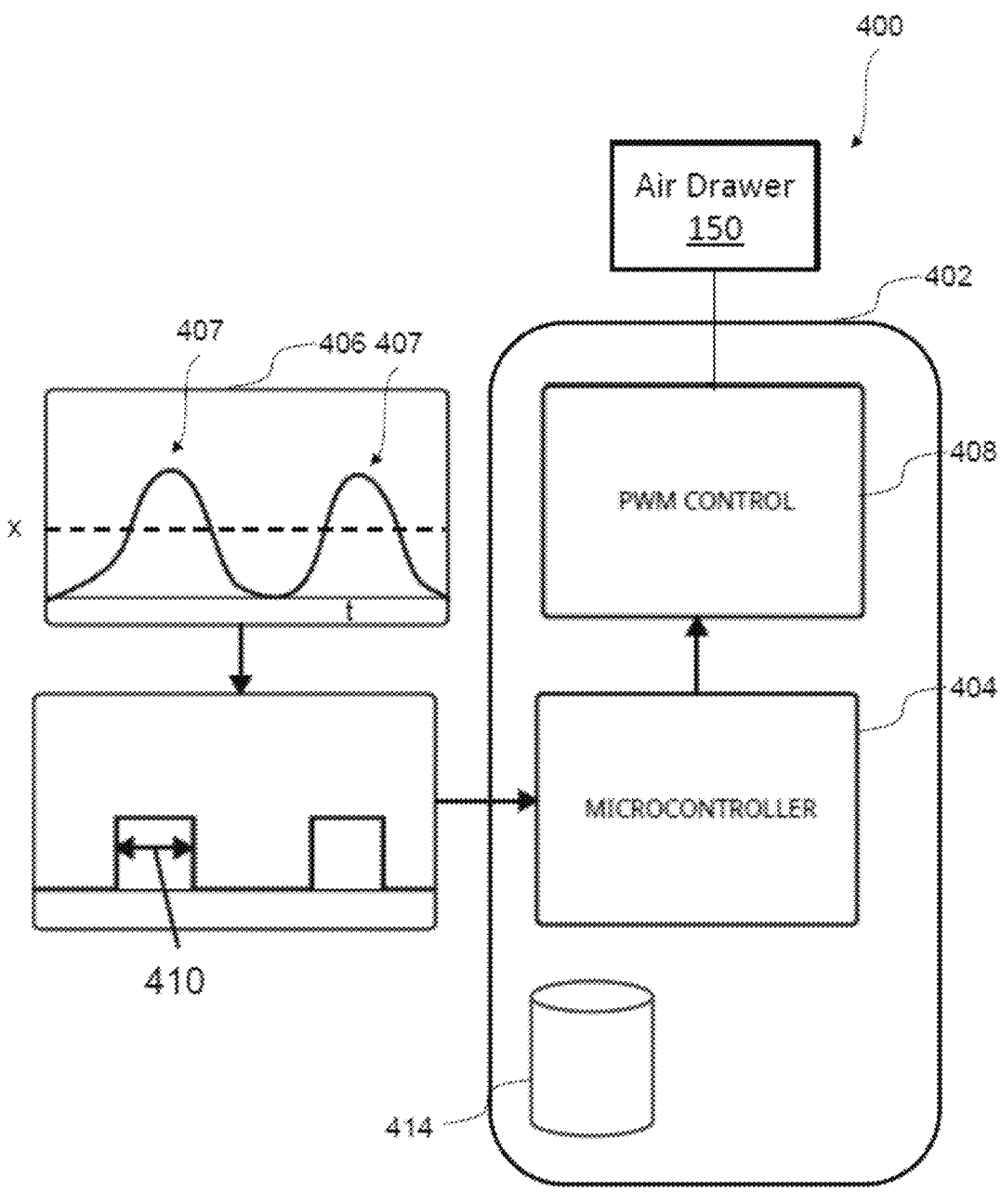
FIG. 4 illustrates a flow control system of a condensation particle counter, in accordance with an embodiment of the present disclosure.

FIG. 4 illustrates an example flow control system 400 of condensation particle counter 100. Flow control system 400 includes a controller 402. The controller 402 can include a microcontroller 404 which collects data of scattered light from photodetector 206. In some embodiments, the collected data is the recorded intensity of photodetector 206 over time as illustrated by signal 406.

Controller 402 identifies intensity peaks 407 in the recorded intensity of signal 406. In some embodiments, intensity peaks are identified when the intensity value exceeds a threshold "x". Since photodetector 206 is positioned off-axis relative to laser beam 204 of laser 202, photodetector 206 records intensity peaks when laser beam 204 is scattered off-axis by a particle 220. Particle 220 or particle 120 can be produced by condensation particle counter 100. Each intensity peak 407 can correspond to the presence of a particle 220. Based on the number of intensity peaks 407 over time, the volume of test fluid 108 illuminated by laser beam 204, and a flow rate of test fluid 108 through detection chamber 102, a concentration of the particles forming particle 120 in environment 107 can be determined. In some embodiments, a curve is fit to empirical readings of pulse width as a function of air drawer speed. In some embodiments, the flow rate of test fluid 108 can be inferred from a speed of air drawer 150 in fluid communication with outlet conduit 146 to pull test fluid 108 and barrier fluid 134 out of detection chamber 102 and a cross-sectional area of test fluid 108 is controlled by a diameter of the opening in nozzle 160.

In some embodiments, a peak 407 is classified as corresponding to a particle 220 based on the width of the peak in time. For example, controller 402 can determine the full-width or half-maximum pulse width 410 associated with a given peak 407. The pulse width can be compared to a threshold width to determine if the intensity peak 407 is representative of a particle 220 or not (e.g., above a threshold then classify as a particle). Sometimes two particles can be close enough spatially to be detected as peak 407. The peak 407 will have an extra-long width due to the presence of two particles passing sequentially through laser beam 204.

Controller 402 includes a PWM control logic 408 which compares pulse width 410 to a second threshold. In the example, if the second threshold is exceeded, it is determined that at least two particles are passing through laser beam 204 in close proximity. In some embodiments, PWM control logic 408 can control a speed of air drawer 150 to control the flow rate of test fluid 108 through detection chamber 102 and hence through laser beam 204. When pulse width 410 exceeds the second threshold, controller 402 increases the speed of air drawer 150 to pull test fluid 108 and its particles faster and thus increase the separation between particles as they enter detection chamber 102 from nozzle 160. By increasing the separation between particles, individual peaks are produced for each particle. The increased speed will reduce the amount of time that a given particle is passing through laser beam 204 and thus, controller 402 can adjust the first and second thresholds accordingly.

Controller 402 can further include at least one memory 414 which can store instructions for execution by microcontroller 404, such as PWM control logic 408, data collected by photodetector 206 and processed by microcontroller 404, and additional information. Example memories can be volatile (such as RAM), non-volatile (such as ROM, flash memory, etc.), or some combination of the two. In some embodiments, controller 402 can be coupled with or otherwise include a transceiver or wired network connection to communicate with a remote computing device.

While the invention has been described in conjunction with the specific embodiments described herein, it is evident that many alternatives, combinations, modifications, and variations are apparent to those skilled in the art. Accordingly, the example embodiments of the invention, as set forth herein are intended to be illustrative only, and not in a limiting sense. Various changes can be made without departing from the spirit and scope of the invention.

What is claimed is:

1. An apparatus, comprising:
a detection chamber comprising a test axis;
a first fluid conduit in fluid communication with the detection chamber and comprising a test fluid, wherein the first fluid conduit comprises a saturation chamber and a condensation chamber;
a second fluid conduit in fluid communication with the detection chamber separate from the first fluid conduit and having a barrier fluid; and
a detection system configured to monitor at least one characteristic of the test fluid to determine a number of particles in the test fluid, the barrier fluid separating the test fluid from the detection system,
wherein test fluid enters the detection chamber through a nozzle in an opening in a lower wall of a detection housing and the barrier fluid enters the detection chamber through a space formed between a wall of the opening and the nozzle,
wherein the wall of the opening, the nozzle, a chamber of the second fluid conduit, and the detection chamber are a part of the test axis, and
wherein, prior to entering the space formed between the wall of the opening and the nozzle, the barrier fluid can spread throughout the chamber of the second fluid conduit such that the barrier fluid forms a cylindrical barrier to the test fluid to reduce communication of vapor from the test fluid to parts of the detection chamber outside of the cylindrical barrier according to the test fluid having a vapor pressure higher than a vapor pressure of the barrier fluid within the detection chamber.

2. The apparatus of claim 1, wherein the test fluid passes through the detection chamber along the test axis in a first direction.

3. The apparatus of claim 2, wherein the barrier fluid passes through the detection chamber in a second direction.

4. The apparatus of claim 3, wherein the first direction is parallel to the second direction.

5. The apparatus of claim 1, wherein the detection system is configured to monitor the at least one characteristic of the test fluid within the detection chamber to determine the number of particles in the test fluid, and wherein the barrier fluid separates the test fluid from the detection system within the detection chamber.

6. The apparatus of claim 1, further comprising an outlet fluid conduit configured to carry the test fluid or the barrier fluid away from the detection chamber.

7. The apparatus of claim 1, wherein the barrier fluid surrounds the test fluid.

8. The apparatus of claim 1, wherein the second fluid conduit has a dryer inner surface than the inner surface of the first fluid conduit.

9. The apparatus of claim 1, wherein the second fluid conduit comprises a filter to remove particles in the barrier fluid sized from 2.0 nm to 100,000 nm.

10. The apparatus of claim 1, wherein the test fluid has a temperature similar to a temperature of the barrier fluid within the detection chamber.

11. The apparatus of claim 1, wherein a portion of the test fluid contacts a portion of the barrier fluid forming a fluid interface in the detection chamber.

12. The apparatus of claim 11, wherein the fluid interface has an interface vapor pressure less than a saturation vapor pressure of the test fluid.

13. The apparatus of claim 1, further comprising:
a first temperature control apparatus coupled to a wall of the saturation chamber to control a temperature of the test fluid passing through the saturation chamber to a first temperature; and
a second temperature control apparatus coupled to a wall of the condensation chamber to control a temperature of the test fluid passing through the condensation chamber to a second temperature, the second temperature being different from the first temperature.

14. The apparatus of claim 13, wherein the first temperature is higher than the second temperature when the test fluid has a Lewis Number of larger than one.

15. The apparatus of claim 13, wherein the first temperature is lower than the second temperature when the test fluid has a Lewis Number of less than one.

16. The apparatus of claim 1, wherein the detection system comprises:
a laser configured to produce a laser beam; and
a photodetector configured to detect light scattered from the laser beam hitting a particle in the test fluid.

17. The apparatus of claim 16, wherein the detection system is configured to adjust the intensity of the laser beam based on detection of scattered light by the photodetector.

18. A system, comprising:
a detection chamber comprising a test axis;
a first fluid conduit in fluid communication with the detection chamber and comprising a test fluid, wherein the first fluid conduit comprises a saturation chamber and a condensation chamber;

a second fluid conduit in fluid communication with the detection chamber separate from the first fluid conduit and having a barrier fluid;

a detection system configured to monitor at least one characteristic of the test fluid to determine a number of particles in the test fluid, the barrier fluid separating the test fluid from the detection system; and an air drawer in fluid connection with the detection chamber configured to pull the test fluid through the first fluid conduit, wherein test fluid enters the detection chamber through a nozzle in an opening in a lower wall of a detection housing and the barrier fluid enters the detection chamber through a space formed between a wall of the opening and the nozzle, wherein the wall of the opening, the nozzle, a chamber of the second fluid conduit, and the detection chamber are a part of a test axis, and wherein, prior to entering the space formed between the wall of the opening and the nozzle, the barrier fluid can spread throughout the chamber of the second fluid conduit such that the barrier fluid forms a cylindrical barrier to the test fluid to reduce communication of vapor from the test fluid to parts of the detection chamber outside of the cylindrical barrier according to the test fluid having a vapor pressure higher than a vapor pressure of the barrier fluid within the detection chamber.

19. A system, comprising:

a detection chamber comprising a test axis;

a first fluid conduit in fluid communication with the detection chamber and comprising a test fluid, wherein the first fluid conduit comprises a saturation chamber and a condensation chamber;

a second fluid conduit in fluid communication with the detection chamber separate from the first fluid conduit and having a barrier fluid;

a detection system configured to monitor at least one characteristic of the test fluid to determine a number of particles in the test fluid, the barrier fluid separating the test fluid from the detection system;

an air drawer in fluid connection with the detection chamber configured to pull the test fluid through the first fluid conduit; and a controller configured to adjust a speed of the air drawer, wherein test fluid enters the detection chamber through a nozzle in an opening in a lower wall of a detection housing and the barrier fluid enters the detection chamber through a space formed between a wall of the opening and the nozzle, wherein the wall of the opening, the nozzle, a chamber of the second fluid conduit, and the detection chamber are a part of a test axis, and wherein, prior to entering the space formed between the wall of the opening and the nozzle, the barrier fluid can spread throughout the chamber of the second fluid conduit such that the barrier fluid forms a cylindrical barrier to the test fluid to reduce communication of vapor from the test fluid to parts of the detection chamber outside of the cylindrical barrier according to the test fluid having a vapor pressure higher than a vapor pressure of the barrier fluid within the detection chamber.

20. The system of claim 19, wherein the test fluid passes through the detection chamber along the test axis in a first direction, wherein the barrier fluid passes through the detection chamber in a second direction, and wherein the first direction is parallel to the second direction.

* * * * *